United States Patent [19]
Nakagawa et al.

[11] Patent Number: 5,209,195
[45] Date of Patent: May 11, 1993

[54] IGNITION DISTRIBUTOR

[75] Inventors: Seiki Nakagawa, Takahama; Yoshitaka Sato; Hideo Asakura, both of Toyohashi, all of Japan

[73] Assignee: Nippondenso Co., Ltd., Kariya, Japan

[21] Appl. No.: 913,476

[22] Filed: Jul. 15, 1992

[30] Foreign Application Priority Data

Jul. 19, 1991 [JP] Japan .................. 3-179737

[51] Int. Cl.⁵ .................. F02P 7/02; H01H 1/02; H01H 19/00
[52] U.S. Cl. .................. 123/146.5 A; 123/633; 200/19 DR; 200/267
[58] Field of Search .................. 123/146.5 A, 633; 200/19 R, 19 DC, 19 DR, 262, 267, 268

[56] References Cited

U.S. PATENT DOCUMENTS

| | | | |
|---|---|---|---|
| 4,146,759 | 3/1979 | Watanabe et al. | 200/19 DR |
| 4,345,120 | 8/1982 | Sawada et al. | 200/19 DR |
| 4,369,343 | 1/1983 | Sone et al. | 200/19 DR |
| 4,565,907 | 1/1986 | Takahashi et al. | 200/19 DR |
| 4,833,282 | 5/1989 | Matsumura et al. | 200/19 DR |
| 5,045,653 | 9/1991 | Ohashi | 200/19 DR |
| 5,134,257 | 7/1992 | Oka et al. | 200/19 DR |

FOREIGN PATENT DOCUMENTS

| | | |
|---|---|---|
| 57-183572 | 11/1982 | Japan . |
| 63-235665 | 9/1988 | Japan . |
| 1-262368 | 10/1989 | Japan . |

Primary Examiner—Willis R. Wolfe
Attorney, Agent, or Firm—Cushman, Darby & Cushman

[57] ABSTRACT

An ignition distributor wherein at least either one of the discharge element of a stationary electrode and the discharge element of a rotary electrode are composed of a sintered body comprising at least a ferrite and silicon oxide and have a surface precipitate layer having a thickness of from 1 to 7 $\mu$m and a silicon oxide content larger than that of a core portion of the sintered body and the discharge element has an electric resistivity of from $10^4$ to $10^6$ $\Omega$ in a portion from a site at which said voltage is applied to the discharge element to a site at which an electric discharge occurs.

4 Claims, 7 Drawing Sheets

IGNITION DISTRIBUTOR

BACKGROUND OF THE INVENTION

1. Field of the Invention

The present invention relates generally to an ignition distributor, particularly to an ignition distributor in which an electric wave noise caused by an electric discharge between rotary and stationary electrodes is minimized.

2. Description of the Related Art

There is conventionally a known ignition distributor having a plurality of stationary electrodes electrically connected to ignition plugs, respectively, and a rotary electrode rotating with a minute minimum distance maintained between one end thereof and the stationary electrodes and with a voltage application to the other end thereof, an electric discharge being triggered to occur between a discharge element of the stationary electrode and a discharge element composing the one end of the rotary electrode, thereby distributing electric power to the ignition plugs alternately when the rotation of the rotary electrode brings the discharge element of the rotary electrode alternately into face of the discharge elements of the stationary elements substantially at the minute minimum distance therebetween.

The conventional ignition distributor suffers from electric wave noise because of spark discharge for distribution, affecting radios, televisions and other telecommunication devices. To solve this problem, Japanese Unexamined Patent Publication (Kokai) No. 1-262368 proposed an ignition distributor having a discharge element composed of a ferrite core surrounded by a surface layer containing silicon oxide, having a thickness of from 10 to 100 $\mu$m and many concavities and protrusions with a diameter of from 0.5 to 50 $\mu$m.

The proposed ignition distributor is very advantageous for suppressing a radiated electric wave noise but not radio noise in a weak electric field area distant from broadcasting stations for the following reason.

The electric discharge across a minute gap between stationary and rotary electrodes of an ignition distributor includes a capacitance discharge owing to a dielectric breakdown of the gap and an induced discharge along a low resistivity zone in the gap that is generated by ionization owing to the capacitance discharge.

The capacitance discharge occurs over a short time, has a high voltage and a large current and usually generates a strong electric wave noise. The induced discharge occurs over a long time, has a low voltage and a small current and is generally said to contribute to electric wave noise only to a very small extent. Accordingly, the conventional study focuses on electric wave noise caused by the capacitance discharge.

The electric wave noise owing to an electric discharge is regulated by law in Europe, the U.S.A., and some other countries. Electric wave noises are classified into two cases; the first in which electric wave noise radiated from automobiles, for example, affects external radios, televisions and other telecommunication devices (hereinafter referred to as "radiated electric wave noise") and the second in which high frequency electric wave noise affects a car radio or other electronic devices mounted on a car via the antenna, the electric wiring, the car body or other wave paths (hereinafter referred to as "FM radio noise").

Nevertheless, FM radio noise was conventionally considered to be related to radiated electric wave noise, and accordingly, the noise suppression effect was estimated only for the radiated electric wave noise by using an estimation method specified in Europe and the U.S.A. under regulation by law.

The present inventors made a detailed study on the influences brought about by radiated electric wave noise and FM radio noise, separately.

Research was undertaken on the relationship between the estimated value (i.e., radiated electric wave noise) obtained by using the method specified in Europe and the U.S.A. and actual FM radio noise both in strong electric field areas near broadcasting stations and in weak electric field areas distant from broadcasting stations. The result shows that a good relationship is observed in the strong electric field areas such that FM radio noise was low when the estimated value was small, but in weak electric field areas, the relationship is poor, and on one occasion, FM radio noise did occur when the estimated value was small, and on another occasion, no FM radio noise occurred when the estimated value was large.

This is considered because improvements in conventional ignition distributors has significantly reduced the substantial influence of the electric wave noise caused by a capacitance discharge both on the outside and the inside of a car, and thereby, the influence of the noise caused by an induced discharge, concealed behind the influence of a capacitance discharge noise, has been revealed particularly in the case of a car radio having the receiving port located very close to the noise source.

SUMMARY OF THE INVENTION

The object of the present invention is to provide an ignition distributor for internal combustion engines, in which both radiated electric wave noise and FM radio noise are simultaneously minimized by having an improved discharge element disposed on at least either one of the stationary and rotary electrodes.

To achieve the object according to the present invention, there is provided an ignition distributor having a plurality of stationary electrodes electrically connected to ignition plugs, respectively, and a rotary electrode rotating with a minute minimum distance maintained between one end thereof and the stationary electrodes and with a voltage application to the other end thereof, an electric discharge being triggered to occur between a discharge element of the stationary electrode and a discharge element composing the one end of the rotary electrode, thereby distributing electric power to the ignition plugs alternately when the rotation of the rotary electrode brings the discharge element of the rotary electrode alternately into face of the discharge elements of the stationary elements substantially at the minute minimum distance therebetween, wherein:

at least either one of the discharge element of the stationary electrode and the discharge element of the rotary electrode are composed of a sintered body comprising at least a ferrite and silicon oxide, have a surface precipitate layer having a thickness of from 1 to 7 $\mu$m and a silicon oxide content larger than that of a core portion of the sintered body surrounded by the surface precipitate layer; and the discharge element has an electric resistivity of from $10^4$ to $10^6$ $\Omega$ in a portion from a site at which the voltage is applied to the discharge element to a site at which the electric discharge occurs.

Preferably, the surface precipitate layer comprises a mixture of a globular precipitate and an acicular precipitate, the ferrite comprises at least one selected from the group consisting of Ni—Zn ferrite, Mn—Zn ferrite, Cu—Zn ferrite and Mg—Zn ferrite, and the sintered body comprises at least one selected from the group consisting of cobalt oxide, nickel oxide, zinc oxide, copper oxide and manganese oxide.

DESCRIPTION OF THE PREFERRED EMBODIMENTS

The present inventive ignition distributor ensures a simultaneous suppression of radiated electric wave noise and FM radio noise for the following reasons.

It was generally said that electric wave noise occurs when an electric current changes sharply in a unit time and can be effectively suppressed by inserting a resistor in the concerning circuit. Accordingly, the conventional ignition distributor uses a surface precipitate layer mainly composed of silicon oxide serving as an insulator or resistance upon an electric discharge.

It is true that the thicker the surface precipitate layer, the greater the resistance to discharge and the more effective the suppression of electric wave noise, but a problem arises in that it is difficult for the spark discharge of an ignition distributor to occur.

The capacitance and induced discharges are related to the thickness of the surface precipitate layer as follows.

The capacitance discharge occurs over a short time, has a high voltage, i.e., has sufficiently high energy density to easily break the insulation provided by the surface precipitate layer, and therefore, still does occur even when the thickness of a surface precipitate layer is increased to an extent sufficient to completely suppress radiated electric wave noise caused by the capacitance discharge.

The discharge site of a discharge element, however, is shifted by the rotation of a rotary electrode, so that the induced discharge does not always occur at the portion of the surface precipitate layer where the insulation has been broken by the capacitance discharge.

The induced discharge occurs over a long time, has a low voltage and a small current, i.e., has too low an energy density to break the insulation provided by the conventional thick surface precipitate layer, and therefore, no discharge occurs until the portion of the surface precipitate layer, where the layer thickness has been reduced or the insulation has been broken by the preceding capacitance discharge, comes into position for the induced discharge by the rotation of the rotary electrode, i.e., the ignition distributor is interrupted to effect the discharge. Conventionally, this interruption of discharge raises the level of FM radio noise.

The induced discharge is not substantially influential in the strong electric field area near broadcasting stations but the influence does appear remarkably in the weak electric field area distant from broadcasting stations.

The thickness of the surface precipitate layer according to the present invention enables the FM radio noise to be suppressed to a low level by ensuring that the low energy density of the induced discharge can break the insulation of the surface precipitate layer.

Figure 1:
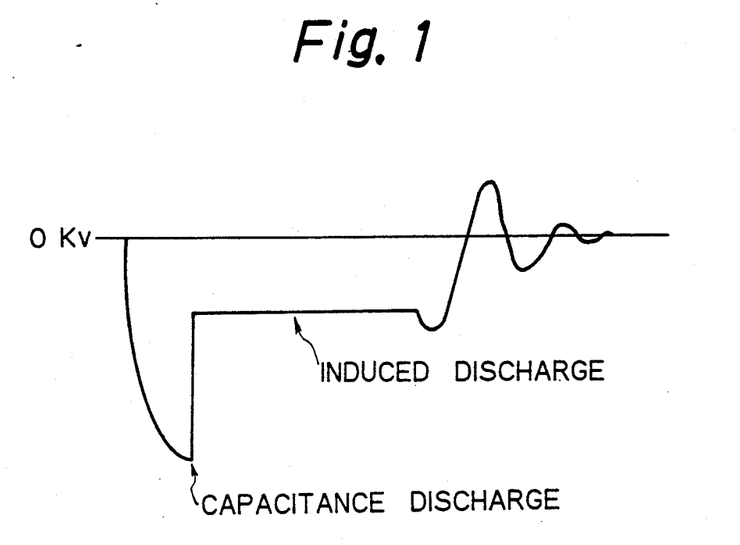
FIG. 1 schematically illustrates a characteristic wave profile of the discharge voltage obtained when the surface precipitate layer has a thickness of 4 μm.
Figure 2:
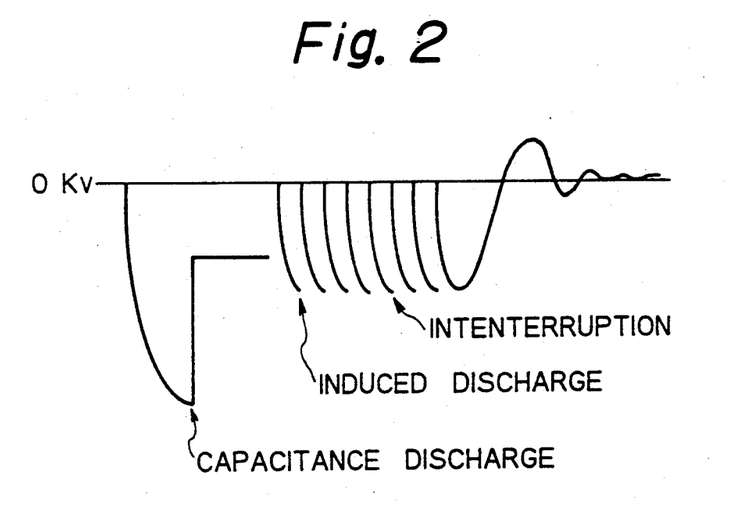
FIG. 2 schematically illustrates a characteristic wave profile of the discharge voltage obtained when the surface precipitate layer has a thickness of 10 μm.

FIGS. 1 and 2 schematically illustrate characteristic wave profiles of a discharge voltage obtained by using a surface precipitate layer having a thickness of 4 μm according to the present invention and by using a conventional surface precipitate layer having greater thickness of 10 μm, respectively, demonstrating that the former ensures a continuous, stable duration of the induced discharge whereas the latter results in an interrupted or intermittent occurrence of the induced discharge.

EXAMPLE

Figures 3, 4:
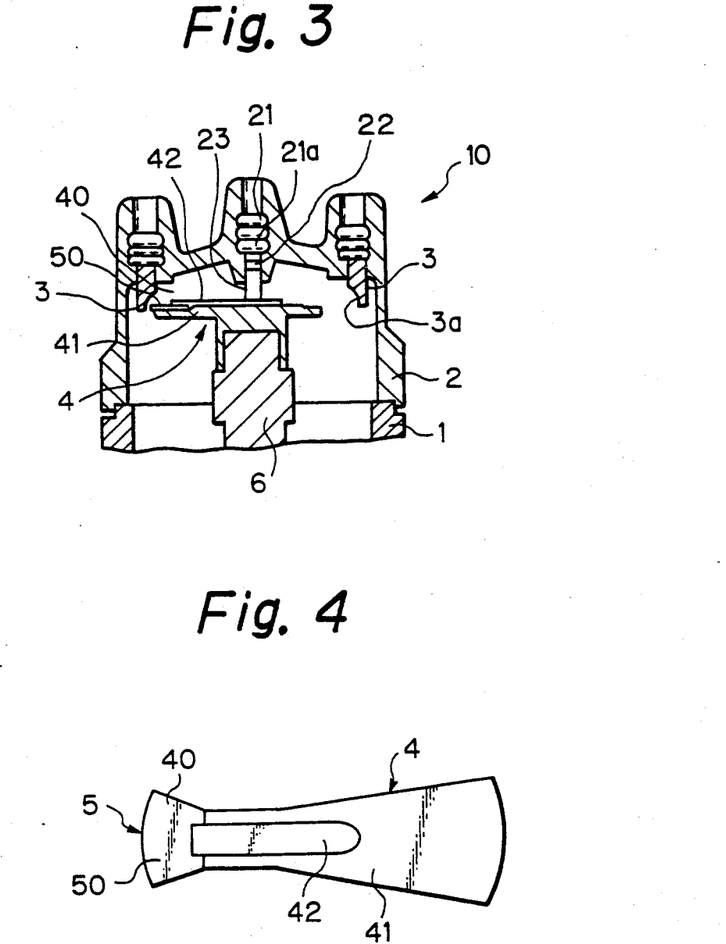
FIG. 3 shows an ignition distributor according to the present invention, in sectional view.
FIG. 4 shows a distributing element according to the present invention, in plan view.

FIG. 3 shows an arrangement of an ignition distributor for internal combustion engines, according to the present invention.

An ignition distributor 10 according to the present invention comprises a housing 1, a cap 2, a plurality of stationary electrodes 3 and a rotary electrode 40 disposed on a distributing element 4. The stationary electrodes 3 are electrically connected to ignition plugs not-shown via high voltage cables. A center terminal 21 disposed at the center of the ignition distributor 10 is electrically connected to a secondary coil of an ignition coil not-shown. The lower or inner end 21a of the center terminal 21 is connected to a slide element 23 via an electroconductive spring 22 in the compressed condition to exert a pressing force on the slide element 23 thereby bearing the slide element 23 against the rotary electrode 40.

The distributing element 4 is mounted at the top end of a cam shaft 6, which is disposed in the housing 1 and is rotated by being interlocked with a crank shaft of an internal combustion engine.

FIG. 4 shows, in an enlarged plan view, the distributing element 4 composed of an insulating base 41 and the rotary electrode 40 mounted on the base 41.

The rotary electrode 40 comprises a discharge element 50 and a metal plate 42 electrically connected to the discharge element 50. The metal plate 42 of the rotary electrode 40 is in a pressed contact with the slide element 23 under the influence of a pressing force exerted by the electroconductive spring 22. The top edge 5 of the discharge element 50 of the rotary electrode 40 provides a discharging site, i.e., a site for an electric discharge to occur, and is brought into face of a discharging surface 3a of the stationary electrodes 3 alternately at a minute gap therebetween, corresponding to the rotation of the distributing element 4. When the rotary electrode 40 is in face of one of the stationary electrodes 3 at a minute gap as shown in FIG. 3, a high voltage generated by an ignition coil is applied to the center terminal 21 to generate a spark discharge across the minute gap between the top end 5 of the discharge element 50 and the discharging surface 3a of the stationary electrode 3. The thus-generated spark discharge results in a high voltage to be applied to an ignition plug not-shown electrically connected with the minute gap in series so that an electric discharge occurs in the plug to thereby provide the desired ignition of an internal combustion engine.

A rotary electrode 40 of the present invention is provided with a discharge element 50 of the present invention.

Figure 5:
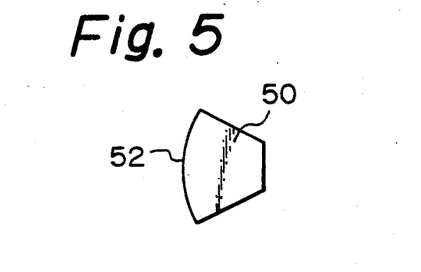
FIG. 5 shows a discharge element according to the present invention, in plan view.

A discharge element 50 is a ceramic electrode having a shape as shown in FIG. 5, and is composed of a core of Ni—Zn ferrite surrounded by a surface precipitate layer 52 having a thickness of from 1 to 7 μm and containing silicon oxide in an amount greater than that of the core because of a precipitation reaction occurring among the ferrite, silicon oxide and cobalt oxide, in which an electric discharge is allowed to occur on the surface precipitate layer.

As having a core composed of Ni—Zn ferrite, the discharge element 50 per se serves as a resistance. The present inventors first paid attention to the variation in radiated electric wave noise and FM radio noise corresponding to the resistivity of the discharge element 50 and the condition of the surface precipitate layer and found an interrelationship therebetween.

Measurements were carried out in the following manner, including the measurement of radiated electric wave noise and FM radio noise.

The radiated electric wave noise was measured according to a method authorized in Europe and the U.S.A. under regulation by law (see CISPR, Pub. 12), except that a car bonnet was opened to allow a high level of radiated electric wave noise to escape and thereby provide a clear result.

The measured results were estimated by a comparison with a conventional thermal-sprayed rotor, which is a discharge element comprising a metallic rotary electrode having a discharging surface coated with CuO and $Al_2O_3$. The measured radiated electric wave noise was evaluated by taking the noise level of the thermal-sprayed rotor as a standard.

The FM radio noise was measured by using an antenna located 10 cm distant from a noise source emitting a noise generated by a discharge between the stationary electrodes 3 and the discharge element 50 disposed at the top edge of the rotary electrode 40, the antenna detecting the emitted noise while the distributing element 4 being rotated at 750 rpm by the cam shaft 6. Specifically, a separate signal generator generates a 90 MHz FM signal of an intensity comparable to that of a broadcasting electric wave experienced in a weak electric field area; the generated FM signal and the noise detected by the antenna are mixed by a mixer; the mixed signal is supplied to a radio and aurally received through the speaker to estimate the noise level.

The aurally received noise is classified into four levels, i.e., level 1 at which no noise is heard, level 2 at which the noise is detected but is not distracting, level 3 at which the noise is distinctly detected, and level 4 at which the noise is very strong; levels 1 and 2 are considered good.

The discharge elements 50 used for the measurement had surface precipitate layers with different thicknesses, i.e., five levels of 0, 1, 4, 7 and 10 μm, and had five levels of the resistivities of $10^3$, $10^4$, $10^5$, $10^6$ and $10^7$ Ω.

These discharge elements were produced by using different mixing ratios of Ni—Zn ferrite, silicon oxide and cobalt oxide and different sintering temperatures. Note that the discharge element with a surface precipitate layer thickness of 0 μm was produced by sintering the ferrite alone.

The discharge elements 50 with a surface precipitate layer thickness of from 1 to 7 μm and a resistivity of from $10^4$ to $10^6$ Ω were produced in a way such that, for example, a Ni—Zn ferrite containing 49 to 51 mol% iron oxide ($Fe_2O_3$) was mixed with 4 to 6 wt% cobalt oxide (CoO) and 3 to 6 wt% silicon oxide ($SiO_2$), the mixture was milled, dried, calcined, ground, pelletized, compressed and fired at different temperatures of from 1360° to 1400° C., in a known manner.

The discharge element 50 with a resistivity of $10^7$ Ω was produced in the same way as the above, except that the mixture had a different composition in which the Ni—Zn ferrite contained 48 mol% iron oxide and the cobalt oxide amount was 7 wt%, the silicon oxide amount being the same as above, for example. The discharge element 50 with a resistivity of $10^3$ Ω was also produced by using a different composition of the mixture in which the Ni—Zn ferrite contained 52 mol% iron oxide and the cobalt oxide amount was 3 wt%.

When the Ni—Zn ferrite contained 49 to 51 mol% iron oxide ($Fe_2O_3$) and the cobalt oxide (CoO) amount was 4 to 6 wt%, the use of a silicon oxide amount of more than 7 wt% provided a surface precipitate layer thickness greater than 7 μm whereas the use of a silicon oxide amount of less than 2 wt% provided a surface precipitate layer of a thickness less than 1 μm.

For these discharge elements produced under different conditions, the surface precipitate layer thickness was determined as an average thickness along the profile of the layer formed on the discharging surface of a discharge element by using a cut section of the discharge element.

Figure 6A:
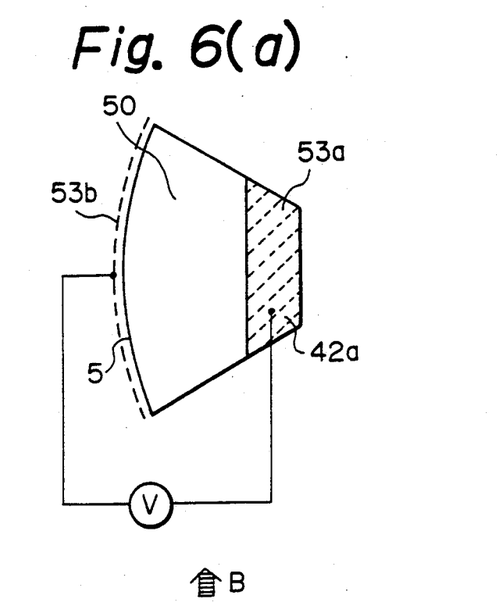
FIGS. 6a, 6b and 6c show the detail of a discharge element according to the present invention, in (6a) plan view, (6b) side view in the direction of arrow A of FIG. 6a and (6c) side view in the direction of arrow B of FIG. 6a, respectively.
Figure 6B:
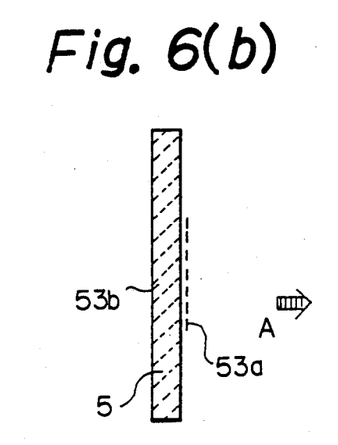
Figure 6C:
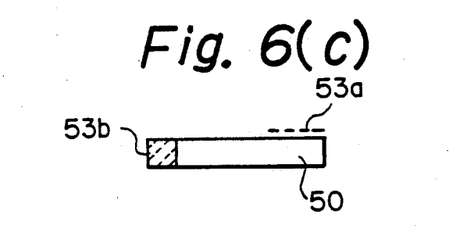

FIG. 6a shows an enlarged plan view of the top edge of a discharge element 50; FIG. 6b a side view in the direction of arrow A in FIG. 6a; and FIG. 6c a side view in the direction of arrow B in FIG. 6a.

The resistivity of a discharge element 50 was measured in such a manner that an electroconductive paste was applied on a discharging surface 5 of the discharge element 50 and on a connecting end 42a of the discharge element 50 that is electrically connected to the metal plate 42 (FIGS. 3 and 4) to which a voltage is applied, to form electrodes 53a and 53b for the measurement, and resistivity was measured by applying a voltage of 500 V across these electrodes 53a and 53b.

In the results described below, the result of the discharge element with $10^7$ Ω was omitted, because an excessively high resistivity creates too large an energy loss upon discharging to be practically used as a discharge element.

Figure 7:
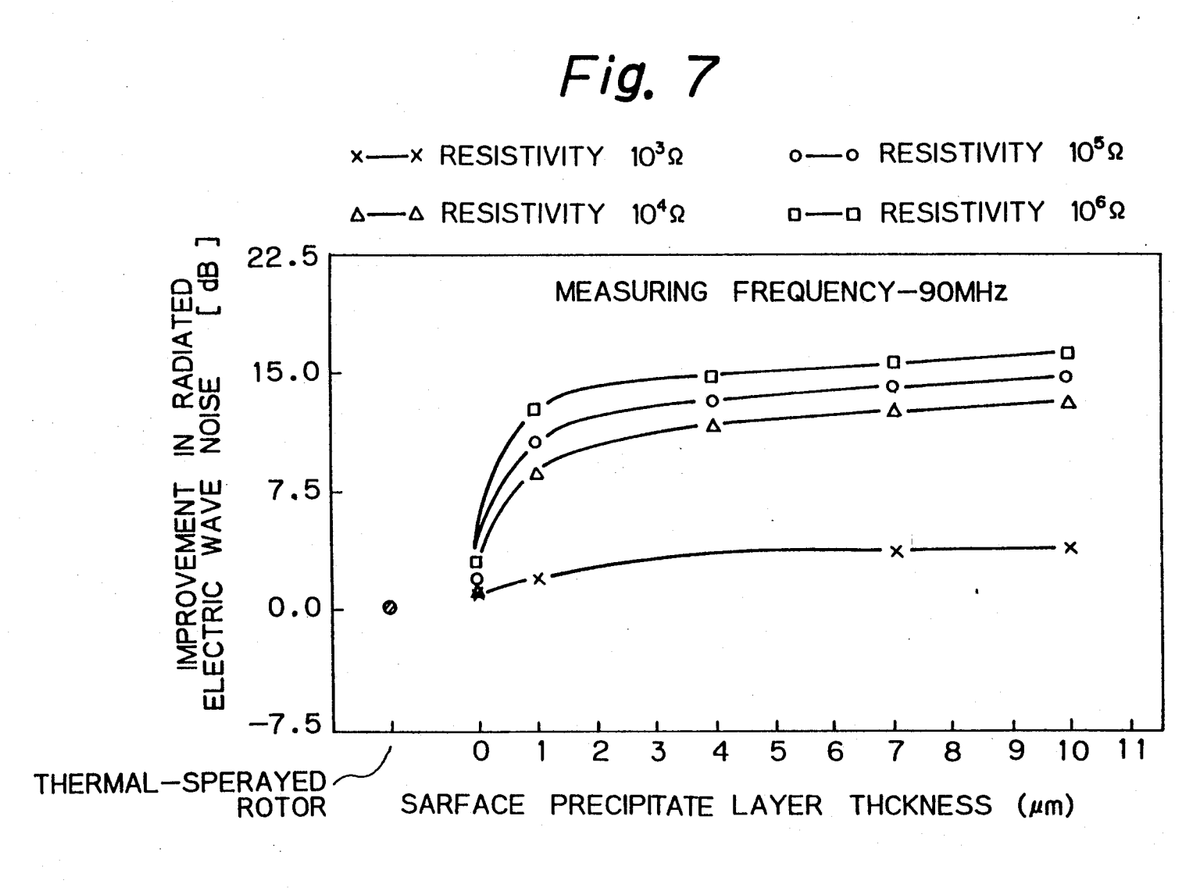
FIG. 7 is a graph showing the radiated electric wave noise as a function of the surface precipitate layer thickness and the resistivity of a discharge element.

FIG. 7 shows the result of radiated electric wave noise observed when using a frequency of 90 MHz. It can be seen from FIG. 7 that the discharge element with a surface precipitate layer thickness of 0 μm obtained by sintering a ferrite alone does not provide a substantial suppression of the radiated electric wave noise, that the discharge elements with resistivities of $10^4$ Ω, $10^5$ Ω, $10^6$ Ω provides a sufficient suppression when the surface precipitate layer has a thickness of 1 μm or more and the suppression effect is further improved with an increase of the layer thickness, and that the discharge element with a resistivity of $10^3$ Ω provides only poor suppression even when the surface precipitate layer has a thickness of 10 μm.

Therefore, radiated electric wave noise is sufficiently suppressed by using a discharge element with a resistivity of from $10^4$ to $10^6$ Ω and a surface precipitate layer thickness of 1 μm or more.

Figure 8:
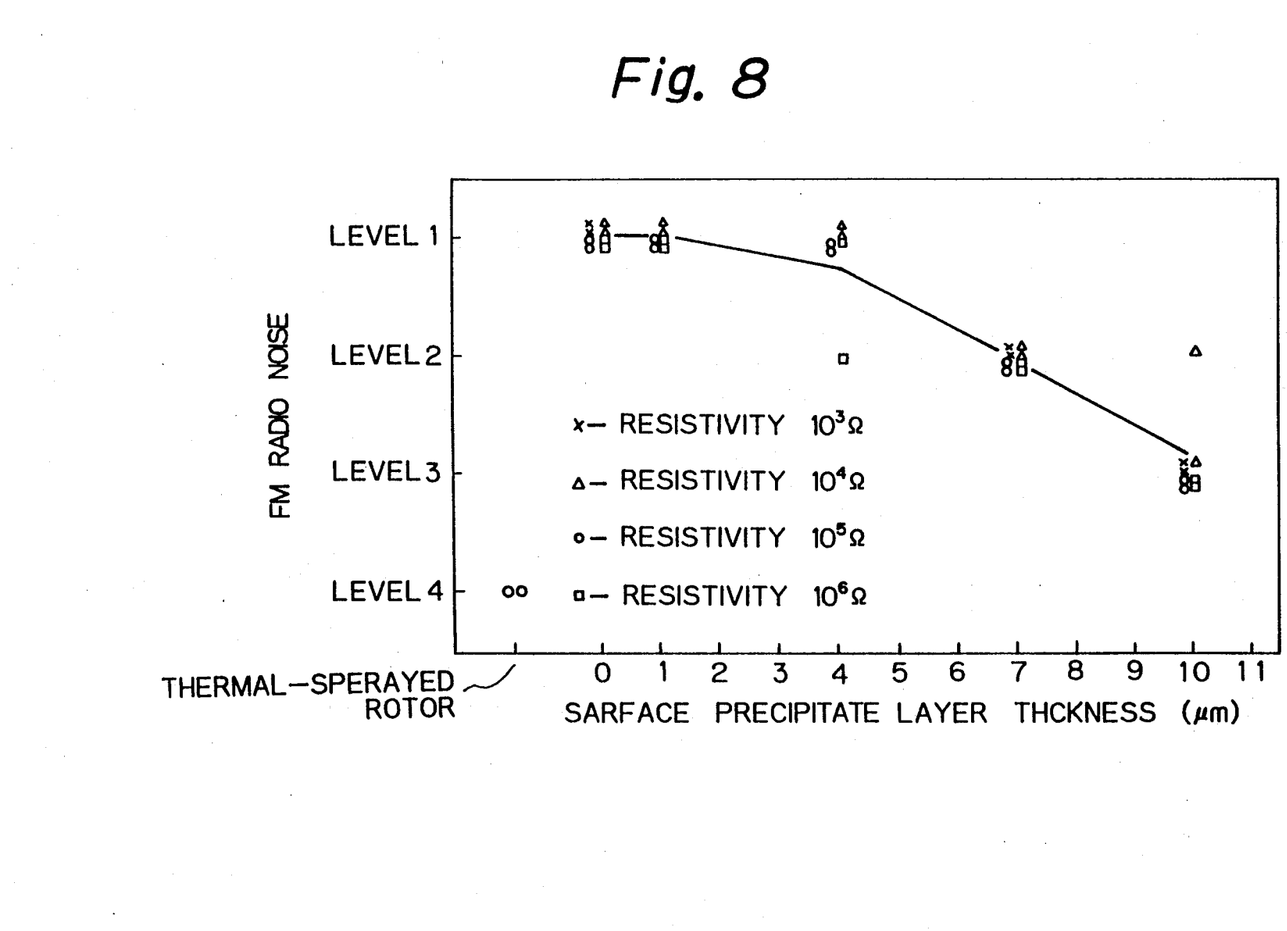
FIG. 8 is a graph showing FM radio noise as a function of the surface precipitate layer thickness and the resistivity of discharge element.

FIG. 8 shows the result of FM radio noise observed under the same condition as the above.

It can be seen from FIG. 8 that FM radio noise is not observed when the surface precipitate layer has a thickness of either 0 μm or 1 μm (classified as "level 1"), is increased with an increase of the surface precipitate layer thickness and reaches and exceeds a practically unacceptable level or "level 2" when the surface precipitate layer thickness is 7 μm or more. Therefore, the FM radio noise is sufficiently suppressed when the surface precipitate layer has a thickness of 7 μm or less.

To summarize the results shown in FIGS. 7 and 8, both radiated electric wave noise and FM radio noise are sufficiently suppressed by using a discharge element having a resistivity of from $10^4$ to $10^6$ Ω and a surface precipitate layer thickness of from 1 to 7 μm.

It can be also seen from FIGS. 7 and 8 that the conventional ignition distributor proposed by the herein previously recited Japanese Unexamined Patent Publication (Kokai) No. 1-262368 and having a surface precipitate layer thickness of 10 to 100 μm, is very effective in suppressing radiated electric wave noise but does not provide substantial suppression of FM radio noise.

Japanese Unexamined Patent Publication (Kokai) No. 1-262368 also describes that the discharge element had a specific resistivity of from $10^4$ to $10^7$ Ωcm, but the present inventors have carried out an experiment and found that the effect of suppressing the radiated electric wave noise varies when the dimension of the discharge element varies: a discharge element 50 having a small conducting area and a large distance between the discharging surface 5 and the metal plate 42 has a high resistivity and is significantly effective in suppressing the radiated electric wave noise, and vice versa, a discharge element 50 having a large conducting area and a small distance between the discharging surface 5 and the metal plate 42 has a small resistivity and is less effective in suppressing the radiated electric wave noise.

From this point of view, the present invention is also advantageous in that a discharge element is specified such that it has a resistivity of from $10^4$ to $10^6$ Ω across the discharging surface 5 and the metal plate 42, and thereby the radiated electric wave noise is stably and effectively suppressed irrespective of the dimension of the discharge element.

The surface precipitate layer of a discharge element according to the present invention comprises a precipitate having a preferred morphology as described in detail below.

Figure 9:
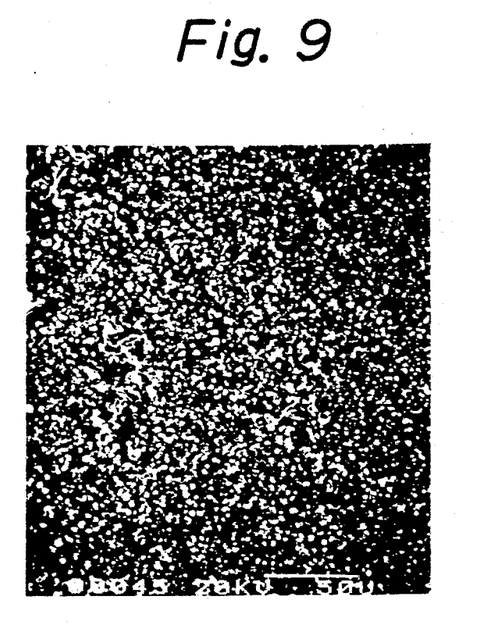
FIG. 9 is a microphotograph showing globular precipitate particles of the surface precipitate layer, observed on the free surface.

The present inventors found that the morphology of the surface precipitate varies corresponding to the temperature at which a mixture of Ni—Zn ferrite, silicon oxide and cobalt oxide is fired or sintered to form a discharge element. When fired at a relatively low temperature, for example, of from about 1345° to about 1355° C., the produced surface precipitate layer is covered by globular precipitates having a diameter less than 5 μm as shown in FIG. 9, which is a microphotograph taken at a magnification of 300.

A chemical analysis showed that the globular precipitate contains a large amount of silicon oxide which is comparable with that of the surface precipitate layer per se.

Figure 10:
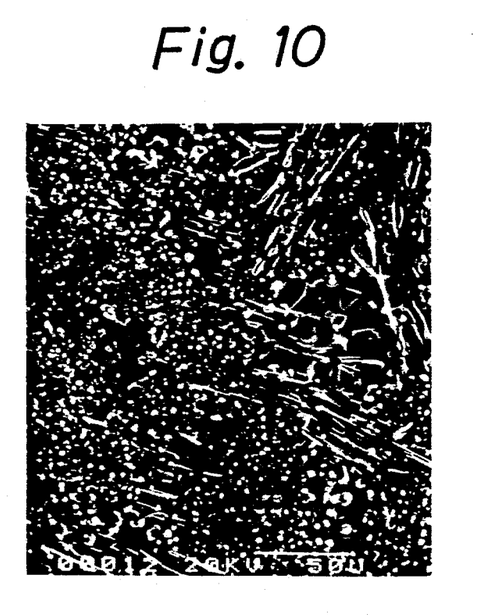
FIG. 10 is a microphotograph showing globular and acicular precipitate particles coexisting in the surface precipitate layer observed on the free surface.

When fired at a higher temperature of from about 1360° to about 1400° C., the produced surface precipitate layer is covered with a mixture of globular and acicular precipitates as shown in FIG. 10, which is a microphotograph taken at a magnification of 300.

A chemical analysis showed that the acicular precipitate has portions in which the silicon oxide content is either as large as that of the surface precipitate layer per se or significantly less than the latter.

When fired at a further higher temperature of above about 1405° C., the silicon oxide is lost and the surface precipitate layer also disappears.

Accordingly, the radiated electric wave noise and the FM radio noise were measured for these three conditions of the surface precipitate layer by using sample "A" with the globular precipitate alone, sample "B" with mixed globular and acicular precipitates and sample "C" in which silicon oxide has been lost. The results are plotted in the graph of FIG. 11.

Figure 11:
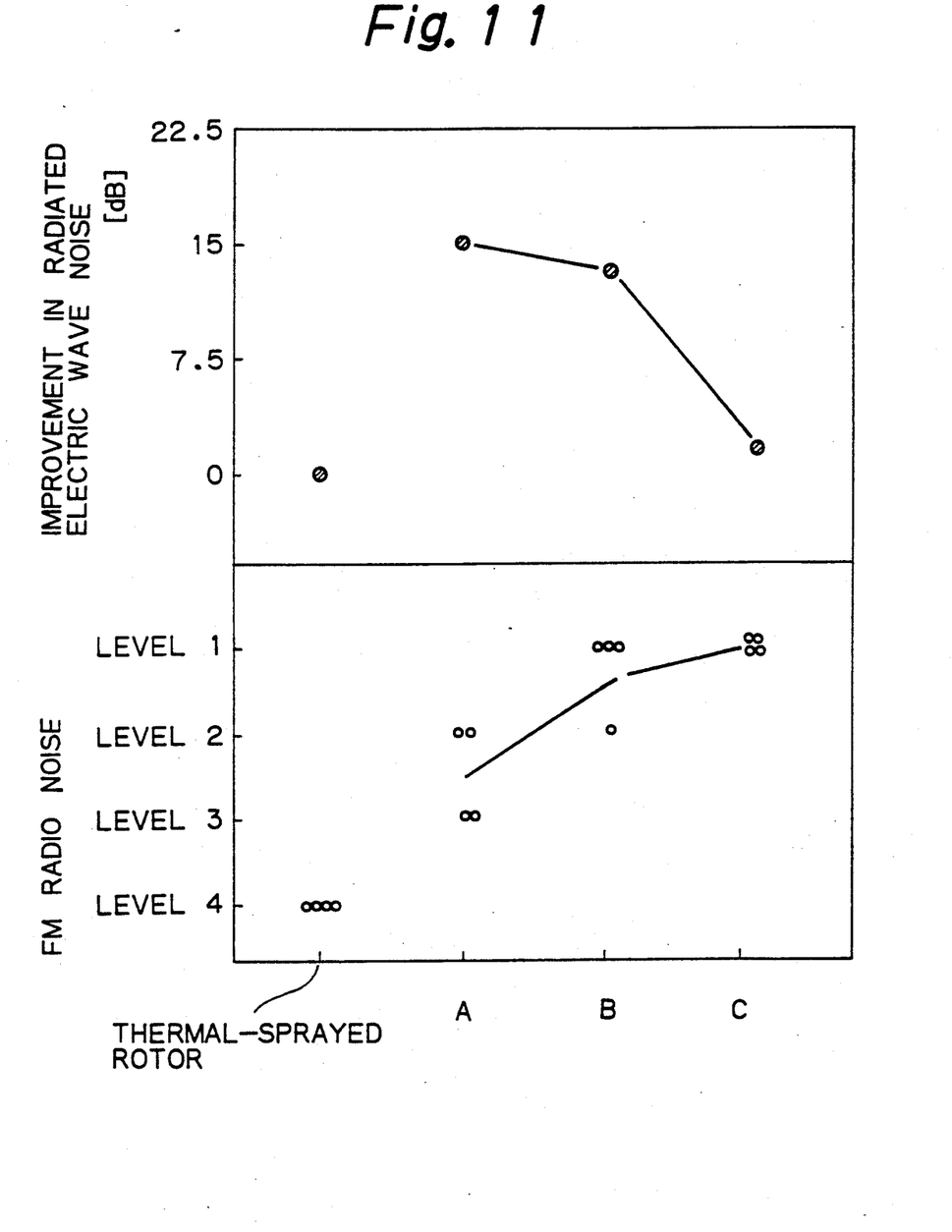
FIG. 11 is a graph showing radiated electric wave noise and FM radio noise as a function of the condition of precipitates.

It can be seen from FIG. 11 that sample "B" with mixed globular and acicular precipitates provides a sufficient suppression of both the radiated electric wave noise and the FM radio noise, that sample "A" with a globular precipitate alone effectively suppresses the radiated electric wave noise but is less effective in suppressing the FM radio noise and that sample "C" with no silicon oxide is effective in suppressing the FM. radio noise but is less effective in suppressing the radiated electric wave noise.

Therefore, the surface precipitate layer preferably comprises a mixture of globular and acicular precipitates in terms of the surface morphology, to most effectively suppress both the radiated electric wave noise and the FM radio noise.

The sintered body composing a discharge element of the present invention comprises at least a ferrite and silicon oxide and is not essentially limited to the compositions of the above-exemplified samples, i.e., the amounts of Ni—Zn ferrite (in mol%), cobalt oxide (in wt%) and silicon oxide (in wt%) may vary so long as a discharge element has a resistivity in the specified range of from $10^4$ to $10^6$ Ω and a surface precipitate layer thickness in the specified range of from 1 to 7 μm necessary for providing the present inventive effect.

Although the above-described samples were produced by sintering Ni—Zn ferrite, silicon oxide and cobalt oxide, the Ni—Zn ferrite may be replaced by Mn—Zn ferrite, Cu—Zn ferrite or Mg—Zn ferrite so long as a discharge element has the specified resistivity and surface precipitate layer thickness necessary for providing the present inventive effect.

The cobalt oxide may be also replaced by nickel oxide, zinc oxide, copper oxide, or manganese oxide so long as the resistivity and the surface precipitate layer thickness satisfies the specified ranges, respectively, for providing the present inventive effect.

As hereinabove described, the present invention provides an ignition distributor in which both radiated electric wave noise outside a car and FM radio noise inside a car are simultaneously suppressed.

We claim:

1. An ignition distributor having a plurality of stationary electrodes electrically connected to ignition plugs, respectively, and a rotary electrode rotating with a minute minimum distance maintained between one end thereof and said stationary electrodes and with a voltage application to the other end thereof, an electric discharge being triggered to occur between a discharge element of said stationary electrode and a discharge element composing said one end of said rotary electrode, thereby distributing electric power to said ignition plugs alternately when the rotation of said rotary electrode brings said discharge element of said rotary electrode alternately into face of said discharge elements of said stationary elements substantially at said minute minimum distance therebetween, wherein:

at least either one of said discharge element of said stationary electrode and said discharge element of said rotary electrode are composed of a sintered body comprising at least a ferrite and silicon oxide, have a surface precipitate layer having a thickness of from 1 to 7 μm and a silicon oxide content larger than that of a core portion of said sintered body surrounded by said surface precipitate layer; and said discharge element has an electric resistivity of from $10^4$ to $10^6$ Ω in a portion from a site at which said voltage is applied to said discharge element to a site at which said electric discharge occurs.

2. An ignition distributor according to claim 1, wherein said surface precipitate layer comprises a mixture of a globular precipitate and an acicular precipitate.

3. An ignition distributor according to claim 1, wherein said ferrite comprises at least one selected from the group consisting of Ni—Zn ferrite, Mn—Zn ferrite, Cu—Zn ferrite and Mg—Zn ferrite.

4. An ignition distributor according to claim 1, wherein said sintered body comprises at least one selected from the group consisting of cobalt oxide, nickel oxide, zinc oxide, copper oxide and manganese oxide.

* * * * *